United States Patent [19]
Fletcher

[11] 3,889,264
[45] June 10, 1975

[54] VEHICLE LOCATING SYSTEM UTILIZING AM BROADCASTING STATION CARRIERS

[76] Inventors: James C. Fletcher, Administrator of the National Aeronautics and Spaced Administration with respect to an invention of George R. Hansen, Jr., Arcadia, Calif.

[22] Filed: May 21, 1973

[21] Appl. No.: 362,145

[52] U.S. Cl. .......................... 343/105 R; 343/112 D
[51] Int. Cl. ............................................... G01s 1/32
[58] Field of Search ..................... 343/105 R, 112 D

[56] References Cited
UNITED STATES PATENTS

| | | | |
|---|---|---|---|
| 3,747,106 | 7/1973 | Dalabakis et al. | 343/112 D |
| 3,774,211 | 11/1973 | Nard et al. | 343/105 R |
| 3,774,215 | 11/1973 | Reed | 343/105 R |

Primary Examiner—T. H. Tubbesing
Assistant Examiner—Richard E. Berger
Attorney, Agent, or Firm—Monte F. Mott; Paul F. McCaul; John R. Manning

[57] ABSTRACT

A vehicle locating system is disclosed which uses the carrier signals of unsynchronized commercial AM broadcasting stations to form hyperbolic isophase grid lines. Each vehicle is equipped with a three-channel receiver, each channel being tuned to a different one of three spaced apart stations to provide to a central station information of motion from a known position by counting isophase lines crossed. A stationary receiver similarly counts isophase lines, which cross some fixed location due to drift in the transmission of the unsynchronized stations, to provide drift information to be subtracted from the vehicle motion information.

10 Claims, 6 Drawing Figures

VEHICLE LOCATING SYSTEM UTILIZING AM BROADCASTING STATION CARRIERS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to radio position finding systems, and more particularly to a receiver system for a hyperbolic continuous wave position finding system employing noncoherent AM broadcasting stations.

The use of isophase hyperbolic fields for determining the position of a vehicle has been widely exploited. In a basic system two coherent stations transmit at distinct frequencies. The signals received by a vehicle are converted to a common frequency for phase comparison. Such systems suffer from inherent ambiguity.

One technique for resolving ambiguity suggested in U.S. Pat. No. 3,303,502 is to determine the vehicles position at some point independently of the radio position finding system, and to then keep track of isophase lanes traversed as the vehicle moves about in the area of the coherent transmitters. That technique was there rejected because it requires uninterrupted reception while the vehicle is in motion, but is not satisfactory in the first instance because the system requires coherent transmitters. An alternative technique resorted to in that patent is the use of a stationary receiver-transmitter and a system of three coherent base transmitters. The stationary transmitter-receiver heterodynes the base signals received in pairs to develop beat frequency signals. A receiver in a vehicle also heterodynes the base signals in pairs to develop independent beat signals for use in conjunction with beat signals from the stationary transmitter-receiver. The two sets of beat signals are then used to resolve ambiguity. U.S. Pat. No. 3,206,751 discloses a similar system for resolving ambiguity with beat signals. Other systems proposed for unambiguous radio position finding have been equally complex and require coherent radio transmitters.

SUMMARY OF THE INVENTION

An object of this invention is to provide a receiver in a vehicle for providing vehicle locating data from signals received from noncoherent AM broadcasting stations.

Briefly, this and other objects are achieved in a vehicle position finding system comprised of noncoherent AM broadcast transmitters spaced apart in an area of interest so as to produce a grid of hyperbolic isophase lines between pairs of transmitting stations. A vehicle operating in this area is equipped with a multi-channel receiver. Each channel receives a unique one of the broadcast signals separately and converts its carrier frequency to a standard frequency for phase comparison with a signal received through another channel and converted to the same frequency. Comparison of a pair of converted signals is made by counting up the number of cycles received and converted from one station, and counting down the number of cycles received and converted from another station. The net count is zero for a stationary vehicle so long as the carrier frequencies of the transmitted signals do not drift. A net count up, or down, is then an indication of vehicle motion in a direction having a vector component in one direction or another parallel to a baseline running from one to the other of a pair of stations. To provide data for correction of error due to the carrier frequency of the stations not being stable, a three-channel receiver is stationed at a fixed location in the area. The apparent motion indicated by the stationary receiver is to be subtracted from the motion indicated by the mobile receiver.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
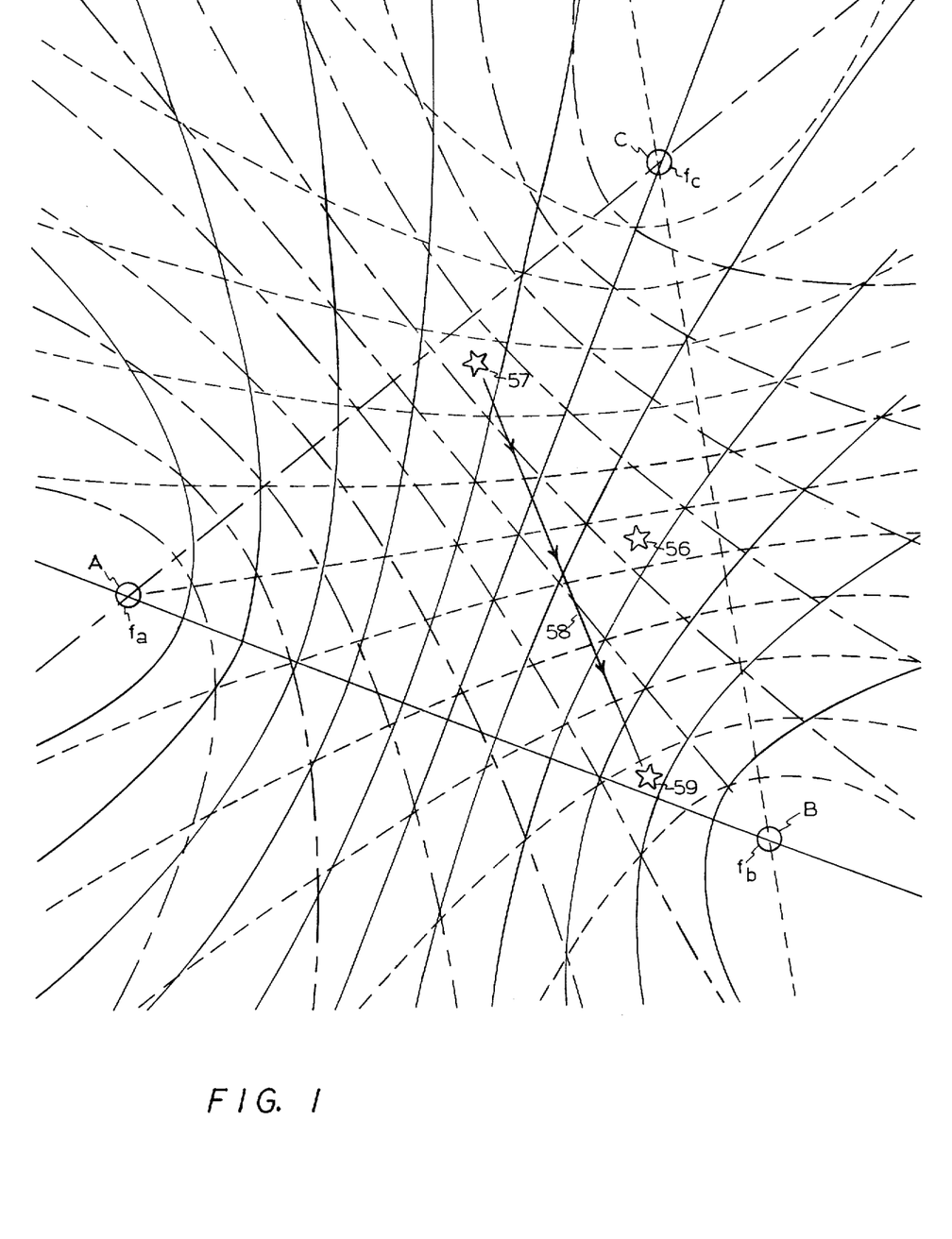
FIG. 1 shows in a plan view, a typical isophase grid produced by three non-coherent AM broadcasting stations for a hyperbolic CW position finding system.

Referring now to FIG. 1, three commercial AM stations, A, B and C are shown ideally spaced so that baselines $a\text{-}b$, $b\text{-}c$ and $c\text{-}d$ form an equilateral triangle. However, it is not necessary that the triangle be equilateral, or even isosceles. It is sufficient for the stations to be so spaced as to form a coordinate system of distinct hyperbolic isophase lines between the pairs of stations.

The isophase lines between the stations A and B are shown as solid lines in FIG. 1 corresponding to the solid line for the baseline $a\text{-}b$. The isophase lines between stations B and C are shown as dotted lines corresponding with the dotted line shown for the baseline $b\text{-}c$, and the isophase lines for the pair of stations A-C are shown as dotted and dashed lines corresponding with the dotted and dashed baseline $a\text{-}c$.

Established navigation systems of the prior art define the area between adjacent isophase lines as lanes which vary in width from 1.5 to 15 kilometers depending on the system. The principle goal of such prior art systems is precise location of a vehicle within a lane. In the present invention, the principle goal is only to keep track of the number of isophase lines crossed as a vehicle moves in the area, and to keep track of the direction in which the vehicle has traversed the isophase line.

Since the location precision is a function of lane width, which will vary with distance from the baselines, it is advantageous to use much narrower lanes than in prior art systems by using higher frequencies, namely frequencies in the bandwidth of 530 to 1600 KHz allocated to commercial AM broadcasting stations which are then converted to a much higher standard frequency in the receiver, namely 1 MHz.

The system is intended for use in metropolitan areas and adjacent suburbs of limited area as compared to the service area of prior art systems. Therefore, the three base stations are selected from the AM broadcasting stations in the area to be serviced such that as much as possible of the area is included within a circle, the circumference of which passes through the base stations. This is easily done because AM transmitting stations are usually located on the outskirts of metropolitan areas. The divergence of hyperbolic isophase lines, and the consequent loss in location precision, can therefore be easily held to reasonable values.

In many applications of the present invention concerned with the general problem of locating emergency vehicles within a given area, a general goal has been to provide location capability to one city block. This distance is roughly 1/6 kilometer, or 1/10 mile. A lane width of this size can be easily generated with a standard frequency of 1 MHz to which each of the AM broadcast signals received are transformed for phase comparison, as will be more fully described hereinafter with reference to FIGS. 2 and 3.

The present invention relies on this frequency transformation (conversion). The relative phases of the separately converted signals are compared to provide narrow isophase lanes. The system does not depend upon an exact integral relationship between the carrier frequencies of the stations, although harmonically related frequencies would simplify somewhat the location process and vehicle equipment. An important advantage of this method is that the AM stations are not required to be synchronized, i.e., the signals to be compared in phase need not be coherent.

Figure 2:
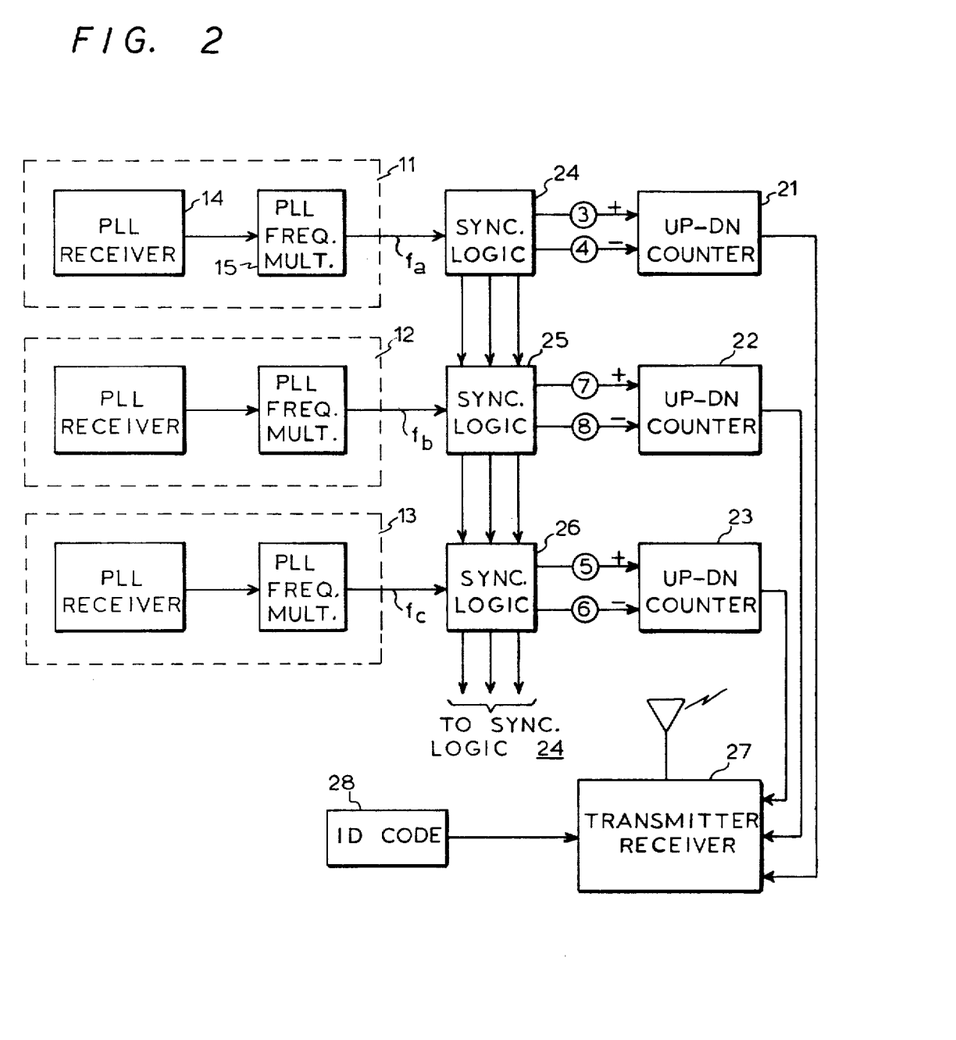
FIG. 2 illustrates a three-channel receiver for a hyperbolic CW position finding system employing non-coherent AM broadcasting stations.

Referring now to FIG. 2, a receiver system for a hyperbolic CW position finding system employing the non-coherent AM broadcasting stations A, B and C of FIG. 1 consists of three receiver channels 11, 12 and 13, each channel consisting of a phase-locked loop (PLL) receiver 14 locked to the carrier frequency of one of the three stations, and a phase-locked loop frequency multiplier 15. In each channel, the phase-locked loop receiver and frequency multiplier cooperate to produce at an output terminal of the channel a signal at a standard frequency selected for this exemplary embodiment to be 1 MHz.

Three up-down counters 21, 22 and 23 are connected to output terminals of the three receiver channels through synchronization logic 24, 25 and 26 in such a manner as to provide a count of hyperbolic isophase lines crossed by the three-channel receiver on a vehicle in motion. Assuming the three channels 11, 12 and 13 are tuned to the respective stations A, B and C, the non-coherent signals at the standard frequency of 1 MHz may then be designated at output terminals of the channels 11, 12 and 13 as $f_a$, $f_b$ and $f_c$, respectively. The phase of the signals $f_a$ and $f_b$ are effectively compared by the up-down counter 21 in order to count the number of isophase lines generated by the stations A and C which are crossed during an interval of time. As will be described more fully hereinafter, an arbitrary assignment can be made as to which direction is called positive and which direction is called negative. The assignment is made by the connections actually made between synchronization logic and the count-up (+) and count-down (−) input terminals of the up-down counter 21. In a similar manner, the up-down counter 22 compares the phase of the signals $f_a$ and $f_b$.

It should be noted that two AM broadcasting stations would not be sufficient to track the motion of a vehicle in the area because motion along an isophase line would produce no data indicating that motion. Three AM broadcasting stations are required to produce as a minimum of two intersecting families of hyperbolic isophase lines. Since three AM broadcasting stations are required for two families of hyperbolic isophase lines, and each unique pair of broadcasting stations will produce a unique family of hyperbolic isophase lines, it is evident that more precise data of motion can be developed by utilizing the third family of hyperbolic isophase lines. That is readily accomplished by including a third phase comparator (up-down counter 23) in conjunction with the three receiver channels required for the minimum system. However, the data from the third up-down counter is not necessary to determine the position of a vehicle carrying the three-channel receiver.

From the foregoing, it is evident that to generate a hyperbolic isophase coordinate system from AM broadcasting station signals, these signals, each of which is phase coherent with its own AM carrier, are first transformed to a standard frequency. To be useful without restraints, this technique requires that the standard frequency be a multiple of the highest common divisor of the available AM carrier signals. However, this is not a detracting restraint since AM frequency allocations are spaced at 10 KHz intervals so that the standard frequency may therefore be a multiple of 10 KHz, such as 1 MHz selected for this exemplary embodiment.

The family of hyperbolic isophase lines generated from each pair of AM broadcast signals is stationary only if the carrier signals are stable. If so, it is only necessary to compare the phases and count the number of isophase lines crossed as the vehicle carrying the three channel receiver moves about in the area. From that count it is possible to determine the vehicle's new position from a known starting point, as will be described more fully hereinafter.

Since the spacing of adjacent isophase lines is a function of distance from the baseline between a pair of stations, a relationship between isophase line counts and actual distance traveled must be computed. However, this system does not require an ability to make such computations in each vehicle in order to determine the position of the vehicle at the current site of the vehicle. Such information would be redundant to the vehicle operator since he probably already knows his location. Information as to the location of the vehicle is important only to a person at a central station, such as a dispatcher of emergency vehicles. Consequently, the computation necessary is carried out at a central station where the location information is desired.

The isophase line counts $f_a-f_b$, $f_b-f_c$ and $f_c-f_a$ are transmitted to the central station by a transmitter/receiver 27 upon interrogation by the central station which transmits a vehicle ID code. When the transmitter/receiver has received and compared the ID code with one stored in a register 28, the transmitter/receiver scans the output of the counters 21, 22 and 23 in sequence to transmit the information serially. The register 28 may consist of simply a bank of preset switches to provide in a binary code an identification number which can be easily entered, and periodically changed as necessary.

As noted hereinbefore, each channel of the three-channel receiver is similar in that it consists of a phase-locked loop receiver and a phase-locked loop frequency multiplier. The receiver channel 11 will now be described in more detail with reference to FIG. 3 as a typical one of the three channels. It consists of an RF amplifier 30 tuned to a station broadcasting at, for example, 530 KHz. The output of the amplifier 30 is applied to a phase detector (mixer) 31 which is connected to the output of a voltage controlled oscillator (VCO) 32. The output of the detector 31 is filtered through a low-pass filter 33 and applied to the VCO to control its frequency at 530 KHz. The VCO output is then applied to the phase-locked loop frequency multiplier 15 where it is first divided by 53 in a frequency divider 34 to provide a controlled output of 10 KHz which is coherent with the carrier of the 530 KHz broadcast signal to which the RF amplifier 30 is tuned. That much of the channel 11 differs from other channels only in that the RF amplifier 30 is tuned to 530 KHz and in that the 530 KHz is divided by 53 to obtain a 10 KHz signal.

Figure 3:
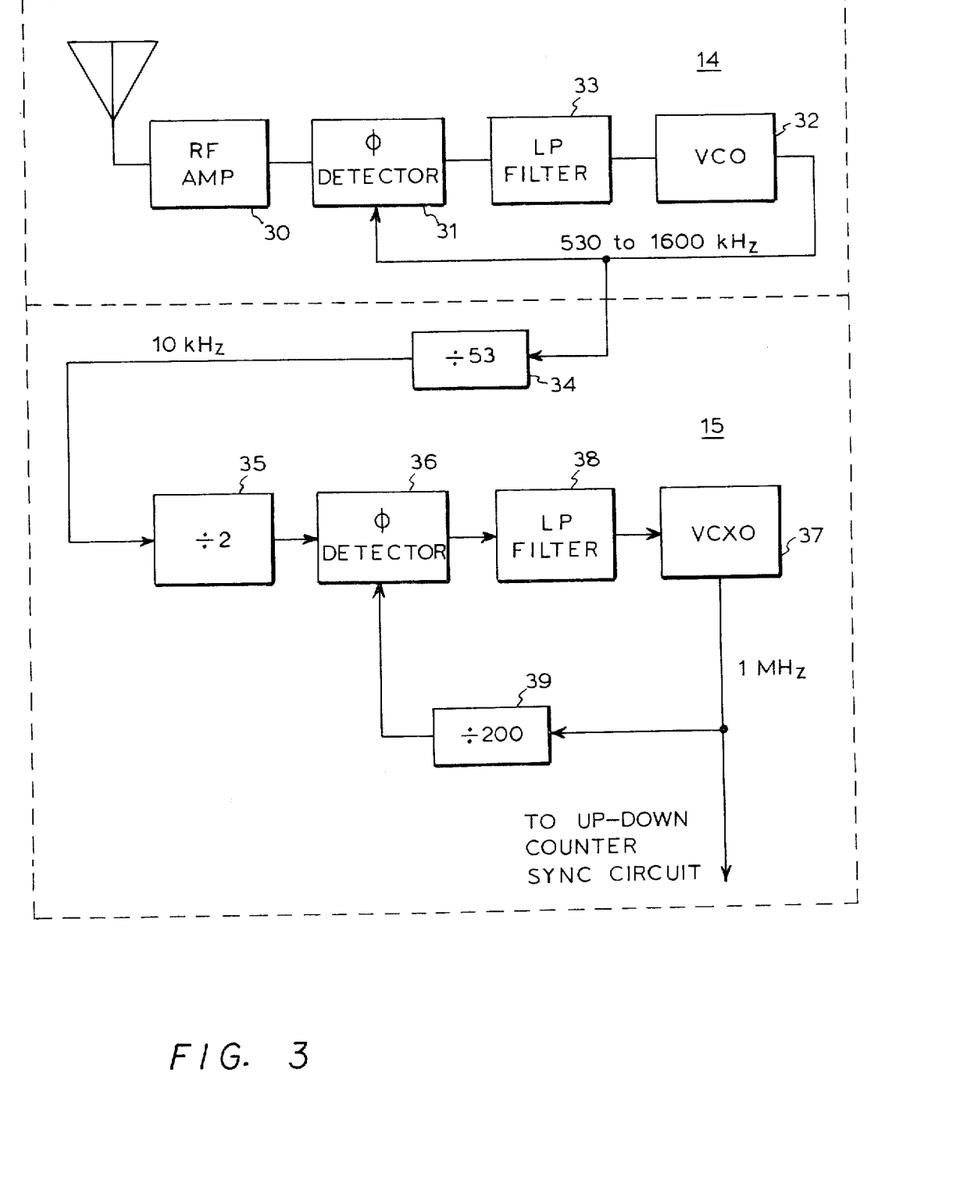
FIG. 3 illustrates in greater detail a single channel of the receiver of FIG. 2.

The 10 KHz signal is applied to a flip-flop 35 which provides a squarewave 5 KHz signal used as the reference input to a phase detector 36. A 1 MHz voltage controlled crystal oscillator (VCXO) 37, controlled by the detector 36 through a low-pass filter 38, is phase-locked to the 5 KHz signal by dividing the oscillator frequency by 200 through a divider 39 to produce a 5 KHz reference signal which is compared to the input signal from the divider 35 in the phase detector 36. The 1 MHz signal is therefore phase locked to the carrier signal of the AM broadcast signal to which the amplifier 30 is tuned. In that manner, three separate receiver channels, each tuned to a different AM broadcast station, will produce three separate 1 MHz signals, each phase coherent with the AM broadcast signal at its input, but not phase coherent with each other.

Once the three separate AM broadcast signals have been converted to a standard frequency of 1 MHz, the problem is to determine the number and direction of traversing isophase lines as the vehicle moves about. As noted hereinbefore, the measurement of the frequency difference and the determination of which is the greater frequency are required. Several techinques are available to determine the frequency difference, but few yield the additional information as to which is the higher frequency. The solution is to use an up-down counter with one frequency providing incrementing pulses and the other decrementing pulses, with the rolls of incrementing and decrementing being arbitrarily assigned. The state of the counter should then indicate the integrated frequency difference between the two signals, which is the algebraic sum of isophase lines traversed.

Figure 4:
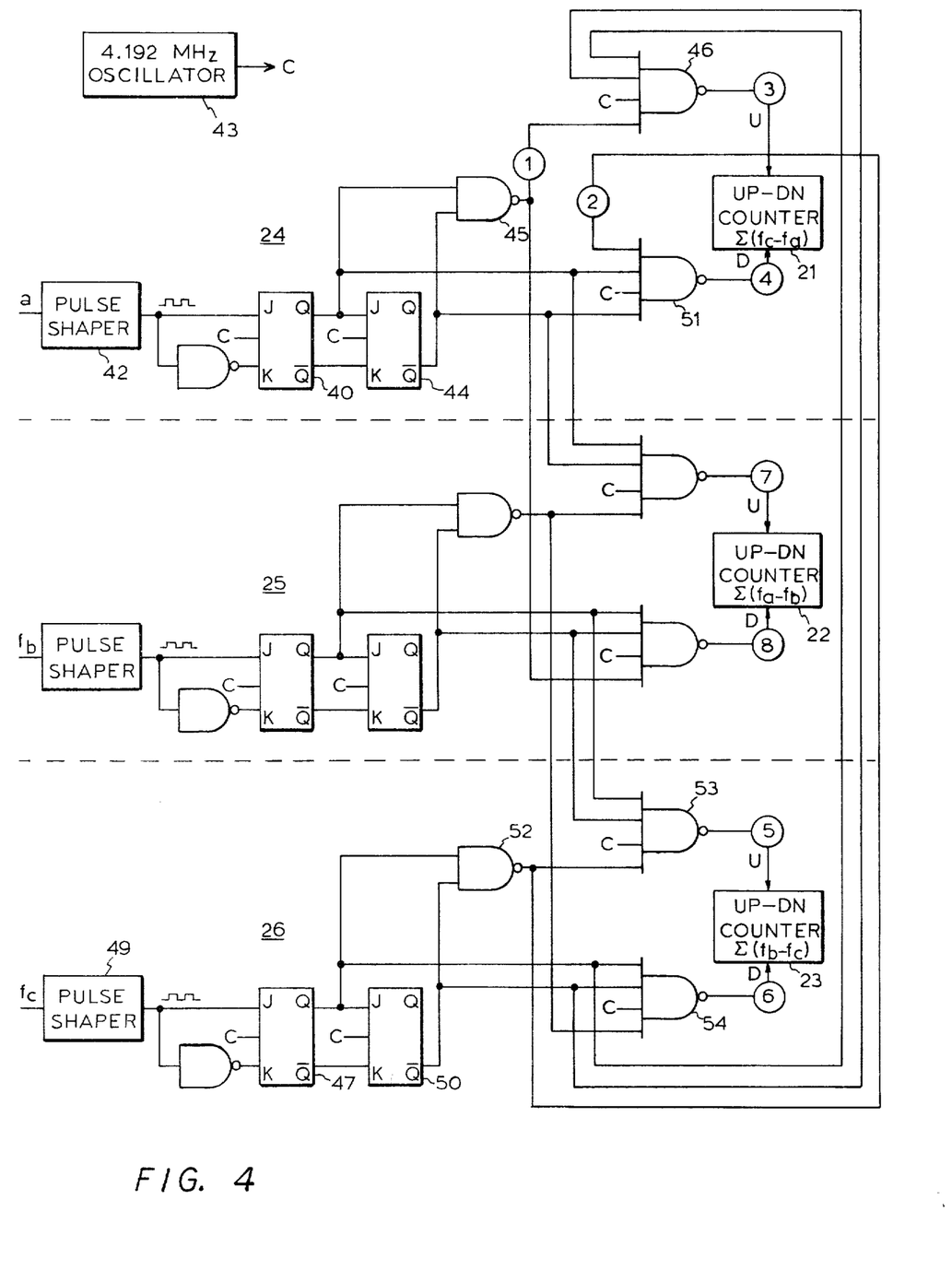
FIG. 4 illustrates a diagram for resynchronization logic in the receiver of FIG. 2.

The up-down counter must respond to every incrementing and decrementing pulse because and pulse missed will displace the measured location by one unit in the hyperbolic isophase line grid. In order to prevent uncertainty in operation of the up-down counter which could be caused by the simultaneous arrival of up and down pulses, resynchronization of the 1 MHz pulses is provided. A synchronizing frequency at least four times the frequency to be counted is required to assure that no pulse is lost or split. The logic for resynchronizing is shown in FIG. 4.

Referring to the resynchronization logic for the receiver channel 11, the output frequency $f_a$ of that channel is applied to a JK flip-flop 40 using a single input NAND gate 41 to apply the complement of the frequency $f_a$ to the K input terminal and applying the output of a pulse shaper 42 directly to the J input terminal of the flip-flop 40. The pulse shaper assures a squarewave form for the 1 MHz signal from the receiver channel 11. The pulse shaper may be implemented as an over-driven operational amplifier which will not disturb the phase of the signal. A clock from a source 43 triggers the flip-flop 40 thus synchronizing its output.

A second flip-flop 44 having its J and K input terminals connected to the Q and $\bar{Q}$ output terminals of the flip-flop 40 is also triggered by the clock from the same source 43. Accordingly, the output of the flip-flop 44 follows the output of the flip-flop 40, but delayed one clock period. The true (Q) output terminal of the flip-flop 40 and the false ($\bar{Q}$) output terminal of the flip-flop 44 are applied to a NAND gate 45 to provide a signal at point ① which is low only when the flip-flop 40 is set and the flip-flop 44 is reset as shown by the waveforms $FF_{40}$ and $FF_{44}$ of FIG. 5, where the subscript identifies the flip-flop from which the signal is derived, and the bar over $FF_{44}$ signifies the complementary ($\bar{Q}$) output signal of that flip-flop.

Point ① is connected to a NAND gate 46 for phase comparison of the signal $f_a$ with the signal $f_c$ which has been synchronized by the synchronizing logic 26 implemented in the same manner with elements 47 through 50 corresponding to elements 40–42 and 44 of the synchronizer 24. The true output terminal of the flip-flop 47 and the false output terminal of the flip-flop 50 of the synchronizer 26 are applied to the NAND gate 46 in the synchronizer 24 to enable a clock pulse to be transmitted to point ③ connected to the up (positive) terminal of the up-down counter 21 of FIG. 2, as shown by the waveform for point ③ in FIG. 5, but only when the output of gate 45 is not true (high), i.e., only when the flip-flop 40 is reset, or the flip-flop 44 is set.

A NAND gate 51 in the synchronizer 24 makes a complementary comparison in the phase of the signals $f_a$ and $f_c$. A NAND gate 52 in the synchronizer 26 is high only when the flip-flop 47 is reset or the flip-flop 50 is set. The output terminal of the NAND gate 52 is connected at point ② to an input terminal of the NAND gate 51. Consequently, the NAND gate 51 transmits a clock pulse to the count-down (negative) terminal of the up-down counter 21 connected to point ④ only when all input terminals of the NAND gate 51 are true, as shown by the waveform diagram for point ④ in FIG. 5. In that manner, the up-down counter 21 sums the difference between cycles of the signal $f_c$ and the signal $f_a$, that is integrates the difference $f_c - f_a$.

If the output of the counter 21 is negative, it is known that the frequency $f_a$ is greater than the frequency $f_c$, and if it is positive, it is known that the frequency $f_c$ is greater than the frequency $f_a$. The counter is sufficiently large to avoid overflowing while counting up or counting down during normal operation, that is to say normal motion of the vehicle carrying the three channel receiver in the area of the hyperbolic isophase line grid.

NAND gates 53 and 54 in the synchronizing logic 26 corresponding to NAND gates 46 and 51 in the resynchronizing logic 24 are provided to compare the frequency of the signal $f_b$ of receiver channel 12 synchronized in the synchronizing channel 25. Points ⑤ and ⑥ are connected to the respective count-up (+) and count-down (−) input terminals, of the up-down counter 23 in FIG. 2. The synchronizing logic 25 similarly provides for comparing the phase of the signal $f_a$ with the phase of the signal $f_b$ by providing at output points ⑦ and ⑧ gated clock pulses to the count-up and count-down input terminals of the counter 22 of FIG. 2.

Figure 5:
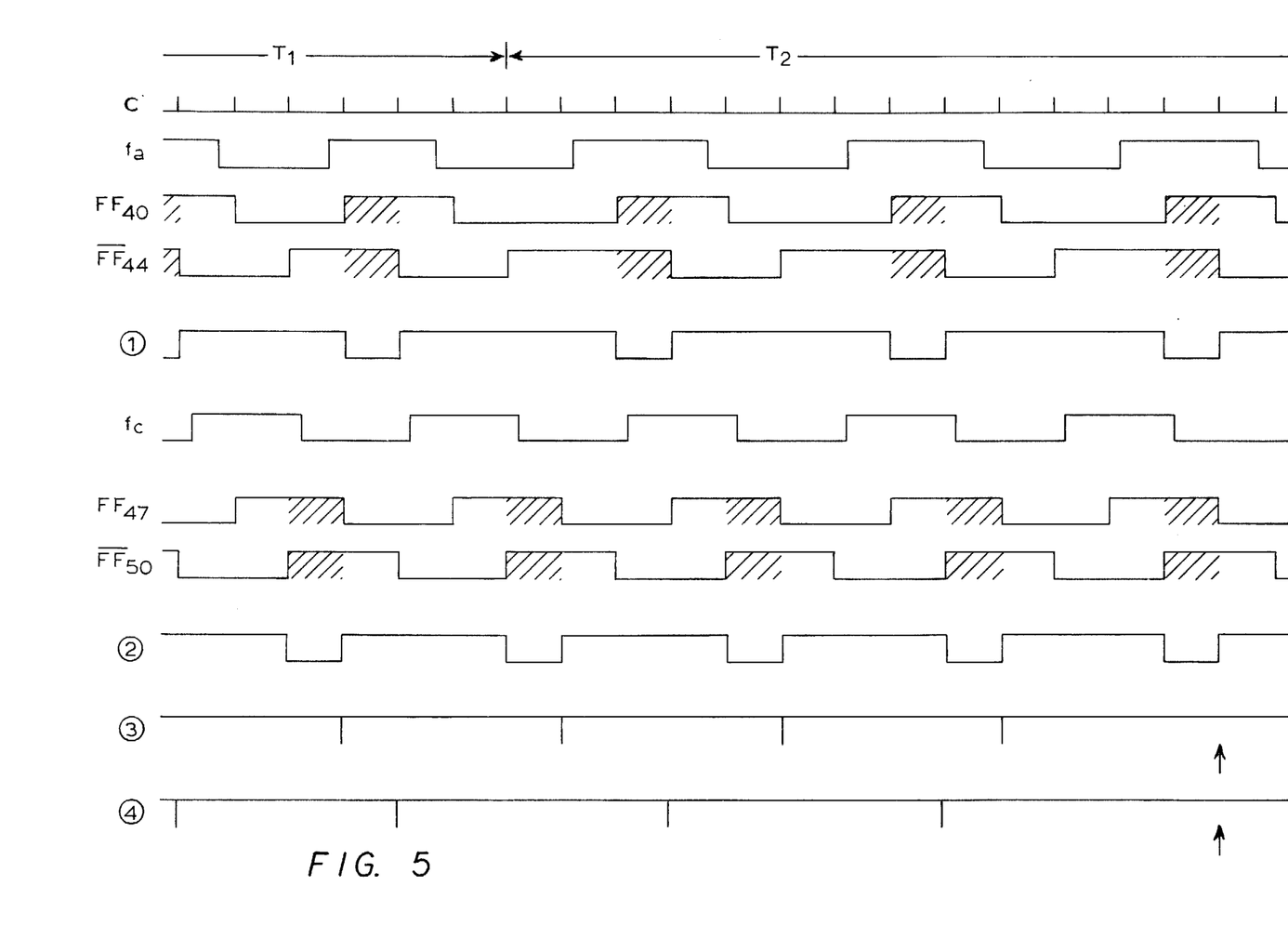
FIG. 5 is a timing diagram of waveforms illustrating the operation of the synchronization logic of FIG. 4.

As noted hereinbefore, the synchronizing logic discards both incrementing and decrementing pulses which are inputs to the same counter and arrive in the same synchronizing intervals, i.e., arrive at the time of the same clock pulse. The waveform diagrams of FIG. 5 illustrate the manner in which that is accomplished by the synchronizing logic 24 for the comparison of the frequencies $f_a$ and $f_c$. During a first period $T_1$, the frequency of the signal $f_c$ is the same as the frequency of the signal $f_a$, but lags in time because the two broadcast stations are not coherent. Consequently, an equal number of pulses are applied to the count-up terminal of the counter 21 as are applied to the count-down input terminal of that counter. During the ensuing period $T_2$, the frequency $f_a$ is decreased due to motion of the vehicle away from the broadcast station of the signal $f_a$. Consequently, fewer pulses are applied to the count-down input terminal than are applied to the count-up input terminal. In this example, three count-up pulses are received while only two count-down pulses are received by the counter 21.

When a fourth pulse would be received at the count-up terminal, a count-down pulse would normally be received by the counter 21, as indicated by the arrows pointing to where pulses would occur in the waveforms of points ③ and ④. Those pulses are inhibited by NAND gates 45 and 52 because all input terminals of both those NAND gates are true when a clock pulse occurs at that point in time. For a clock pulse to appear at point ④ through the NAND gate 51, it would be necessary for the flip-flop 47 to be reset or the flip-flop 50 to be set while the flip-flop 40 is set and the flip-flop 44 is reset. Since that is not the case, the clock pulse occuring at that time is inhibited by gate 52. Similarly, for a clock pulse to appear at point ③ through the NAND gate 46, it would be necessary for either the flip-flop 40 to be reset or the flip-flop 44 to be set while the flip-flop 47 is set and the flip-flop 50 is reset. In that manner, NAND gates 54 and 51 are instrumental in synchronizing the signals $f_c$ and $f_a$ while the NAND gates 52 and 45 are instrumental in inhibiting synchronized pulses which might otherwise occur simultaneously at points ③ and ④, respectively.

From the foregoing, it is evident that the counters 21, 22 and 23 maintain a count which is the integrated algebraic sum of the apparent frequency difference between pairs of AM broadcast stations, each nominally radiating at the standard frequency. Part of any frequency difference may be due to the AM broadcast stations not being stable, i.e., not being exactly on the assigned frequency but most will be due to motion of the vehicle carrying the three-channel receiver.

Information regarding frequency difference due to any drift in the transmitting frequency of one or more of the stations is obtained by placing a stationary three-channel receiver of the same configuration as that described with reference to FIG. 2 at a point in the area represented by a star 56 in FIG. 1. A mobile three-channel receiver represented by a star 57 will induce an apparent frequency difference while moving through the area. A line 58 represnets the track of the mobile receiver from an initial position to another position indicated by a star 59 near the station broadcasting at the frequency $f_b$. Arrow heads indicate the direction of motion. If the position of the vehicle is calculated when it reaches the position 59, the frequency differences of the three counters in the stationary receiver at the position 56 are simply algebraically subtracted from the frequency differences of the counters in the mobile receiver. In that manner, any apparent motion of the mobile receiver due to drift of the hyperbolic isophase grid caused by carrier frequency drift of one or more of the transmitting stations is automatically compensated.

While the algorithm for computing the new position of a vehicle carrying a mobile receiver starting from a known position is not, per se, a part of this invention, an exemplary method of making the computation will now be described.

If the three AM stations, A, B and C, are monitored and the transformation of the carriers yields three signals $f_a$, $f_b$, and $f_c$ at a standard frequency $f$, then the three counters in the vehicles will accumulate counts $N_a$, $N_b$ and $N_c$ in a time $t$ in accordance with the following equations:

$$N_a = (f_a - f_b)t + V_{ab} \cdot t \cdot F(x,y) \cdot f \div C$$
$$N_b = (f_b - f_c)t + V_{bc} \cdot t \cdot G(x,y) \cdot f \div C$$
$$N_c = (f_c - f_a)t + V_{ca} \cdot t \cdot H(x,y) \cdot f \div C$$
$$C = 3 \times 10^8 \text{ m/sec}$$

where $V$ is a function of the vehicle's velocity component parallel to the baseline of the station pair indicated by the subscripts $a$, $b$ and $c$ and $F$, $G$ and $H$ are general equations of the second degree (describing the three families of hyperbolae) in terms of $X$ and $Y$, in a Cartesian coordinate system for plotting the vehicle's position. This system of equations does not yield an explicit analytic solution for the location in terms of $X$ and $Y$, but it does indicate the separability of counts due to differences in the frequencies caused by carrier drift in the station transmitters (first term) and counts caused by vehicle motion (second term). Location accuracy is negligibly influenced by slight differences in frequency from the standard frequency $f$ in the velocity dependent part of the equation.

Figure 6:
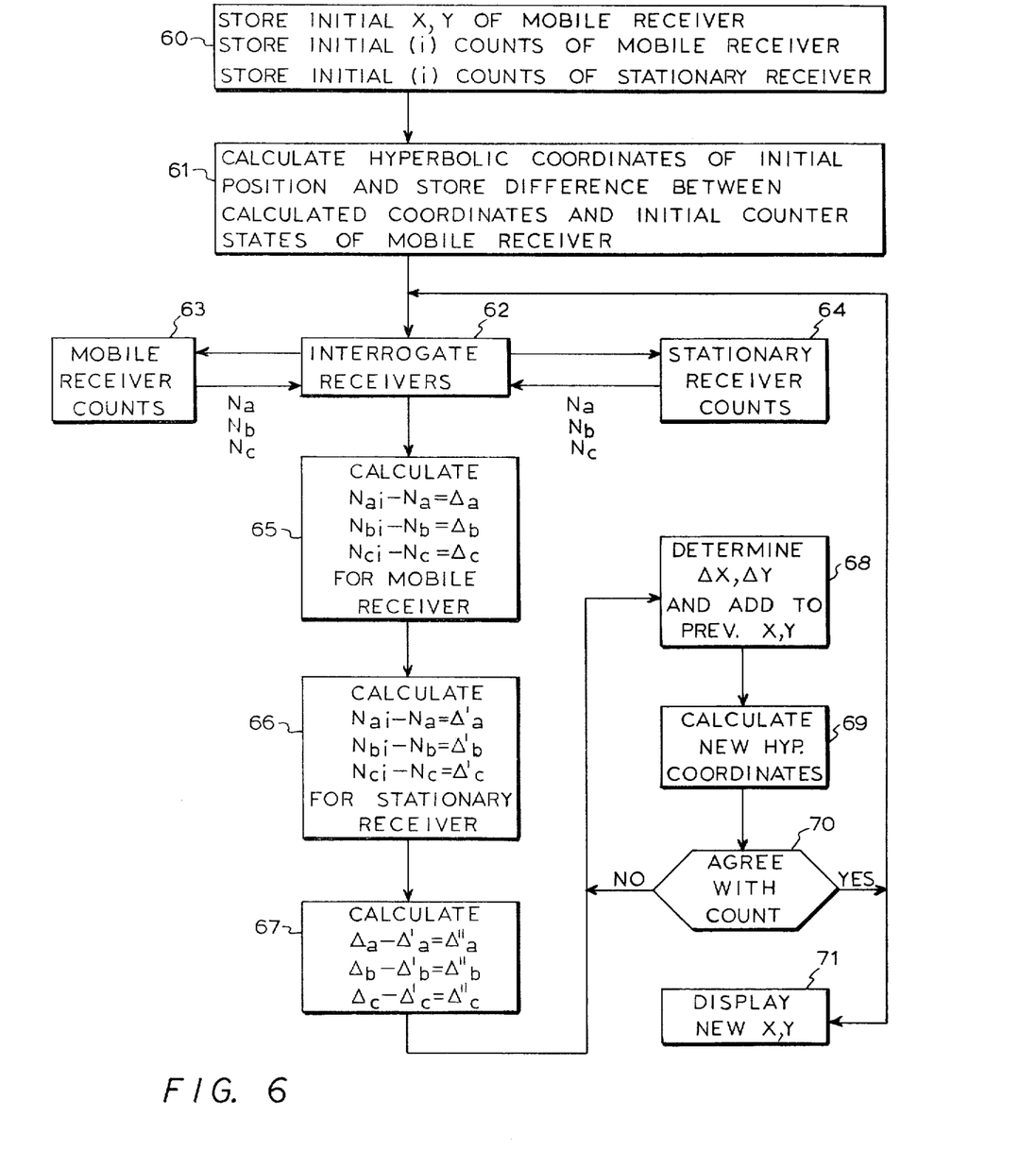
FIG. 6 is a flow diagram showing an algorithm for calculating the position of a vehicle from isophase lines counted in the receiver of FIG. 2.

Referring now to a flow chart in FIG. 6 of the computation, the process is initialized by first receiving the actual geographical location Cartesian coordinates of the vehicle and the initial content of the three counters in the vehicle receiver. See blocks 60. The coordinates in X and Y and the initial counter states $N_a$, $N_b$ and $N_c$ are stored. The counter states of the stationary receiver are also stored at the same instant. An explicit calculation is then made using the vehicle X-Y location and the coordinates of the AM stations which yield the initial location of the vehicle in terms of the parametric families of the hyperbolae. See block 61. Each hyperbola in each family is numbered and the results of this calculation give the initial location of the vehicle in three integers which represent the nearest hyperbola of each family. If the vehicle counters do not agree with the calculated hyperbolic coordinates, the difference can be carried as a correction to be applied to all subsequent vehicle counter tallies. The correction is not otherwise needed in the location solution algorithm.

Subsequent locations are determined by interrogating the current state of the three counters from the vehicle receiver and the stationary receiver. See blocks 62 through 64. Then, in block 65, the initial state of the vehicle counters is subtracted from the current state. Thereafter, in block 66, the change ($\Delta_a'$, $\Delta_b'$ and $\Delta_c'$) in the state of the stationary receiver counters (from the initializing time to the current time) is determined and in block 67 the results of block 66 are subtracted from corresponding results of block 65 to provide the change ($\Delta_a''$, $\Delta_b''$ and $\Delta_c''$) in each of the hyperbolic coordinates caused only by vehicle motion. The new X-Y coordinates of the vehicle location are then calculated with an iterative least-squares algorithm in block 68.

The development of this algorithm is as follows. Given the differences in distances from the vehicle to the AM stations A, B and C (numbered 3, 2, 1) in terms of the hyperbolae "numbers" $N_1$, $N_2$, and $N_3$, $$N_1\lambda \approx D_2 - D_1$$
$$N_2\lambda \approx D_3 - D_2 \quad (1)$$
$$N_3\lambda \approx D_1 - D_3$$

where $\lambda$ is equal to wavelength of the standard frequency and $D_i$ is the distance to station $i$, and letting $V_i$ represent the residual in the general expression $$V_i = (D_{i+1} - D_i) - N_i\lambda \quad (2)$$

then if $$S \equiv \sum_{1}^{3} V_i^2 \quad \begin{array}{l} i = 1,2,3 \\ i+1 = 2,3,1 \end{array} \quad (3)$$

a best fit occurs at $S$ minimum and the necessary conditions are:

$$dS/dX = 0 \text{ and } dS/dY = 0 \quad (4)$$

With the vehicle at $X$-$Y$ the distance in general is $$D_i = [(X - X_i)^2 + (Y - Y_i)^2]^{1/2} \quad (5)$$

Differentiating $V_i$ with respect to $X$ and $Y$:

$$dV_i/dX = (X - X_{i+1}/D_{i+1}) - (X - X_i/D_i) = A_i \quad (6)$$
$$dV_i/dY = Y - Y_{i+1}/D_{i+1} - Y - Y_i/D_i = B_i \quad (7)$$

and $$\frac{dS}{dX} = 2\sum_{i=1}^{3} V_i \frac{\partial V_i}{\partial X} = 0$$

$$\frac{dS}{dY} = 2\sum_{i=1}^{3} V_i \frac{\partial V_i}{\partial Y} = 0 \quad (8)$$

Neglecting the constant and rewritting from Equations (6), (7)

$$0 = \sum_{i=1}^{3} V_i A_i \quad \text{and} \quad 0 = \sum_{i=1}^{3} V_i B_i \quad (9)$$

Expanding $V_i$ around a new location $X+\Delta X$, $Y+\Delta Y$ and neglecting higher order terms:

$$V_i(X+\Delta X, Y+\Delta Y) = V_{(X,Y)} + \delta V_i/\delta X \Delta X + \delta V_i/\delta Y \Delta Y + \ldots \quad (10)$$

Combining Equations (9) and (2) at the new location $$0 = \sum_{i=1}^{3} A_i V_i = \sum_{i=1}^{3} A_i \left( \left[ (D_{i+1} - D_i) - N_i\lambda \right] + \frac{\partial V_i}{\partial X} \Delta X + \frac{\partial V_i}{\partial Y} \Delta Y \right) \quad (11)$$

$$0 = \sum_{i=1}^{3} B_i V_i = \sum_{i=1}^{3} B_i \left( \left[ (D_{i+1} - D_i) - N_i\lambda \right] + \frac{\partial V_i}{\partial X} \Delta X + \frac{\partial V_i}{\partial Y} \Delta Y \right) \quad (12)$$

Substituting for the partial derivatives $$0 = \sum_{i=1}^{3} A_i \left[ (D_{i+1} - D_i) - N_i\lambda \right] + A_i^2 \Delta X + A_i B_i \Delta Y \quad (13)$$

$$0 = \sum_{i=1}^{3} B_i \left[ (D_{i+1} - D_i) - N_i\lambda \right] + A_i B_i \Delta X + B_i^2 \Delta Y \quad (14)$$

rewritting in terms of coefficients of $\Delta X$ and $\Delta Y$ $$\Delta X \sum_{i=1}^{3} A_i^2 + \Delta Y \sum_{i=1}^{3} A_i B_i = \sum_{i=1}^{3} A_i \left[ (D_{i+1} - D_i) - N_i \lambda \right] \quad (15)$$

$$\Delta X \sum_{i=1}^{3} A_i B_i + \Delta Y \sum_{i=1}^{3} B_i^2 = \sum_{i=1}^{3} B_i \left[ (D_{i+1} - D_i) - N_i \lambda \right] \quad (16)$$

let $$C_i = (D_{i+1} - D_i) - N_i \lambda \quad (17)$$

then solving for $\Delta X$ and $\Delta Y$ $$\Delta X = \left( \left( \sum_{i=1}^{3} A_i C_i \right) \cdot \left( \sum_{i=1}^{3} B_i^2 \right) - \left( \sum_{i=1}^{3} B_i C_i \right) \cdot \left( \sum_{i=1}^{3} A_i B_i \right) \right)$$

$$\div \left( \left( \sum_{i=1}^{3} A_i^2 \right) \left( \sum_{i=1}^{3} B_i^2 \right) - \left( \sum A_i B_i \right)^2 \right) \quad (18)$$

$$\Delta Y = \left( \left( \sum A_i^2 \right) \left( \sum B_i C_i \right) - \left( \sum A_i B_i \right) \left( \sum A_i C_i \right) \right)$$

$$\div \left( \left( \sum A_i^2 \right) \left( \sum B_i^2 \right) - \left( \sum A_i B_i \right)^2 \right) \quad (19)$$

The vehicle coordinates for the next iteration are then $$X_1 = X_0 - \Delta X \text{ and } Y_1 = Y_0 - \Delta Y \quad (20)$$

and the distances, coefficients and corrections recalculated until $$|\Delta X| < K \text{ and } |\Delta Y| < K \quad (21)$$

where $K$ is an arbitrary constant representing the desired location precision.

In that manner, the algorithm uses the old X-Y location and develops the required changes in X and Y so that the calculated new position will have the same hyperbolic coordinates as those determined for the vehicle from the current counter states. This method was chosen over an analytic technique as it yields a "most likely" solution in less time than an analytic method which has the additional disadvantage of having several pairs of coordinates as solutions. Only two of the three available hyperbolic coordinates are necessary in all of the calculations as the third coordinate is not independent.

Once new X and Y coordinates are calculated, new hyperbolic coordinates are calculated in box 69, applying any correction found to be necessary in block 61. A check is then made in block 70 to determine whether or not the new hyperbolic coordinates agree with the counters in the vehicle receiver. If so, the new X and Y coordinates computed in block 68 are displayed in block 71, and another cycle is repeated starting with block 62, either on demand or automatically after a lapse of a specified time. If not, the calculations of $\Delta X$ and $\Delta Y$ in block 68 are repeated using the new X and Y coordinates as the previous ones, and adding to them the new $\Delta X$ and $\Delta Y$ computed.

Automatic vehicle monitoring system considerations determine how much information is needed from each vehicle and how often location data should be sent. Prior work in automatic vehicle monitoring has usually emphasized the fixed rate polling method of interrogating vehicles to determine locations. The polling method, if it allows any or all vehicles to travel at maximum speed and still be located to some ultimate precision, maximizes the information flow from each vehicle. If, however, an average speed is assumed for the fleet of vehicles, then higher speed vehicles will not be located to the precision available and parked or slowly moving vehicles will be transmitting much redundant data.

Volunteer polling methods wherein the vehicle initiates a data transmission whenever a significant change in location has occurred require means to avoid contention on the RF data link and must also send additional data to identify which vehicle is transmitting. An adaptive polling technique whereby high-speed vehicles are interrogated at much shorter intervals than average and slowly moving or parked vehicles are infrequently sampled is quite easily mechanized.

The simplest technique, often used in fixed rate polling, has the central station transmit incrementing pulses (tones, or tone bursts) to all vehicles which count and accumulate these incremental signals. When the number of signals received matches the number assigned to the vehicle, a data transmission is initiated from the vehicle. This technique can be made adaptive by the inclusion of a "respond" or "do-not-respond" pulse, tone, or burst which together with the incrementing signal will tell the vehicle whether data is required or not. Conversely, a vehicle which had been immobile could request inclusion in the next polling sequence by responding with an appropriate signal regardless of the command not to send data.

The amount the AM carriers are off frequency together with the sampling intervals of the vehicles determines the number of bits required to be sent to the central station for location purposes. The length of each of the up-down counters is therefore determined by this number of bits. Two AM stations at the low end of the band could cause an 80 Hz beat frequency in the synthesized 1 MHz signals if each station was off assigned carrier by the maximum allowable 20 Hz. This would cause a total count of about 288,000 per hour to be accumulated for the station pair. For comparison, a vehicle cruising at 30 km/hr along the baseline of a station pair would accumulate a count of 200 per hour due only to vehicle motion in a stationary pattern.

A reasonable requirement is that 25 percent of the vehicle fleet be located each 15 seconds, and the remainder located each minute. The total counts accumulated for the aforementioned off-frequency station pair under these requirements would be 1200 for 15 seconds and about 5000 for the minute interval. The length of the three up-down counters would then have to be at least 13 bits each. Some 40 to 50 bits per interrogation would have to be transmitted from each vehicle if an ID code, parity checks, or error detection information is added to the basic 39 bits of location data. Assuming the higher number, and using a 1200 BPS voice channel for response from the vehicle, then only 24 vehicles could be interrogated and located each second. Again using the foregoing requirement, 820 total vehicles could be located each minute with 205 of the vehicles being located each 15 seconds or 4 times each minute for a total of 1435 locations each minute (1440 maximum). It should be realized that these are theoretical maximum numbers and neglect the practical realities of turn-on and stabilization time of the mobile transmitters used for responding and also assumes another channel for polling or interrogation purposes (full duplex interrogation and response).

What is claimed is:

1. In a radio position finding system of the hyperbolic isophase line type in which a plurality of radio signals are continuously received by a vehicle, a plurality of spaced apart AM broadcasting stations, each transmitting at a different frequency independently of the other stations, the number of stations being sufficient to provide at least two unique pairs of stations, each pair providing a family of hyperbolic isophase lines crossing lines of the other pair to form a grid, and a receiver carried by said vehicle, said receiver having a plurality of channels, each channel being tuned to a different one of said stations and having means for coherently converting the radio signal received to a common frequency, whereby all channels provide output signals at said common frequency, and the common frequency signal of each channel is in phase with the radio signal to which it is tuned, said receiver further having a plurality of counting means, each responsive to output signals of a different pair of channels to count up cycles of one signal of the pair and count down cycles of the other signal of the pair, whereby each counter provides a count of isophase lines crossed of a different family of isophase lines as said vehicle moves in an area covered by said grid from which counts a new position of the vehicle may be calculated with reference to a known starting position of the vehicle in said area.

2. In the radio position finding system defined by claim 1, a second receiver like the one carried by said vehicle in the particulars set forth, said second receiver being held stationary to provide counts of isophase lines crossing a fixed point due to drift in the frequencies of said broadcasting stations, whereby said drift counts may be subtracted from corresponding vehicle motion counts from said receiver carried by said vehicle.

3. In a radio position finding system as defined by claim 2, a radio transmitter connected to said second receiver for transmitting said drift counts to a location where said vehicle position is to be calculated.

4. In a radio position finding system as defined by claim 2, a radio transmitter connected to said vehicle receiver for transmitting vehicle motion counts to a central station, and a radio transmitter connected to said second receiver for transmitting said drift counts to said central station where said vehicle position is to be calculated.

5. In a radio position finding system of the hyperbolic isophase line type in which a plurality of signals are received and compared as to phase in pairs, thereby effectively providing a family of isophase lines from each pair, lines from one pair crossing lines of other pairs to provide a grid covering a geographic area, three spaced apart and unsynchronized AM broadcasting stations, each transmitting at a different frequency, and a receiver carried by said vehicle as it moves about in said area, said receiver comprising three receiver channels, each tuned to a different station and each having means for multiplying the signal received to a predetermined frequency, the output signal of each channel at said predetermined frequency being in phase with the signal received from a broadcast station, three up-down counters, each for comparing the phase of a different pair of channel output signals by counting up cycles of one channel output signal, and counting down cycles of another channel output signal of the pair being compared, and means for coupling said channel output signals to said counters in pairs.

6. The combination of claim 5 wherein said coupling means comprises a clock pulse source and synchronizing logic means responsive to clock pulses from said source for producing noninterfering pulses from cycles of said channel output signals, whereby cycles of one pair of channel output signals are counted up and down regardless of how close they are in phase.

7. The combination of claim 6 wherein said synchronizing means includes means for inhibiting each one of said counters from counting up or down when cycles of a pair of channel output signals being compared by the counter are in phase as received.

8. In a radio finding system as defined by claim 7, a second receiver like the one carried by said vehicle in the particulars set forth, said second receiver being held stationary to provide counts of isophase lines crossing a fixed point due to drift in the frequencies of said broadcasting stations, whereby said drift counts may be subtracted from corresponding vehicle motion counts from said vehicle receiver counters.

9. In a radio position finding system as defined by claim 8, a radio transmitter connected to said second receiver for transmitting said drift counts to a location where said vehicle position is to be calculated.

10. In a radio position finding system as defined by claim 8, a radio transmitter connected to said vehicle receiver for transmitting vehicle motion counts to a central station, and a radio transmitter connected to said second receiver for transmitting said drift counts to said central station where said vehicle position is to be calculated.

* * * * *